United States Patent
Foresman et al.

(10) Patent No.: US 10,306,863 B2
(45) Date of Patent: Jun. 4, 2019

(54) SYSTEM AND METHOD FOR PREPARATION CUP ATTACHMENT

(71) Applicant: Technologies Holdings Corp., Houston, TX (US)

(72) Inventors: Mark A. Foresman, Houston, TX (US); Bradley J. Prevost, Pearland, TX (US)

(73) Assignee: Technologies Holdings Corp., Houston, TX (US)

(*) Notice: Subject to any disclaimer, the term of this patent is extended or adjusted under 35 U.S.C. 154(b) by 400 days.

(21) Appl. No.: 15/204,918

(22) Filed: Jul. 7, 2016

(65) Prior Publication Data
US 2018/0007859 A1      Jan. 11, 2018

(51) Int. Cl.
| | |
|---|---|
| A01J 3/00 | (2006.01) |
| A01J 5/017 | (2006.01) |
| A01J 5/007 | (2006.01) |

(52) U.S. Cl.
CPC ............ *A01J 5/0175* (2013.01); *A01J 5/007* (2013.01); *G05B 2219/45113* (2013.01)

(58) Field of Classification Search
CPC ........... A01J 5/0175; A01J 5/017; A01J 5/007
See application file for complete search history.

(56) References Cited

U.S. PATENT DOCUMENTS

| | | | | |
|---|---|---|---|---|
| 2008/0314324 | A1* | 12/2008 | Pettersson | A01J 5/0175 119/14.08 |
| 2012/0272903 | A1* | 11/2012 | Hofman | A01J 5/0175 119/14.02 |
| 2012/0272904 | A1* | 11/2012 | Hofman | A01J 5/017 119/14.02 |
| 2012/0275662 | A1* | 11/2012 | Hofman | A01J 5/007 382/110 |

(Continued)

FOREIGN PATENT DOCUMENTS

| | | |
|---|---|---|
| EP | 878 338 | 1/2008 |
| WO | WO 00/12270 | 3/2000 |

(Continued)

OTHER PUBLICATIONS

Communication from European Patent Office; Application No. 17180016.2-1655; 9 pages, dated Dec. 4, 2017.

(Continued)

*Primary Examiner* — Richard G Davis
(74) *Attorney, Agent, or Firm* — Baker Botts L.L.P.

(57) ABSTRACT

A robotic arm maneuvers a teat preparation cup and executes instructions from a robotic arm controller. The controller comprises an interface, a memory, and a processor. The processor instructs the sensor to perform a first scan. If the first scan discovers a first set of teats, the processor moves the robotic arm a first distance and instructs the sensor to perform a second scan. If the second scan discovers a second set of teats, the processor moves the robotic arm to a location under the first teat, and instructs the sensor to perform a third (Continued)

scan. The processor determines if the third scan discovers a third set of teats. If each of the first set, second set, and third set of discovered teats comprises the first teat, the processor instructs the robotic arm to attach the preparation cup to the first teat.

20 Claims, 6 Drawing Sheets

(56)  References Cited

U.S. PATENT DOCUMENTS

2014/0029797 A1* 1/2014 Eriksson ............... A01J 5/0175
                                                    382/103
2018/0213742 A1* 8/2018 Jagodzinski .......... A01J 5/0175

FOREIGN PATENT DOCUMENTS

| WO | WO 02/07098 | 1/2002 |
| WO | WO 2007/050012 | 5/2007 |

OTHER PUBLICATIONS

Innovation, Science and Economic Development of Canada Requisition by Examiner for Application No. 2,972,543; 4 pages, dated Nov. 29, 2017, (Received Dec. 12, 2017).
Communication from European Patent Office; Application No. 1780016.2-1655; 9 pages, dated Dec. 4, 2017.

* cited by examiner

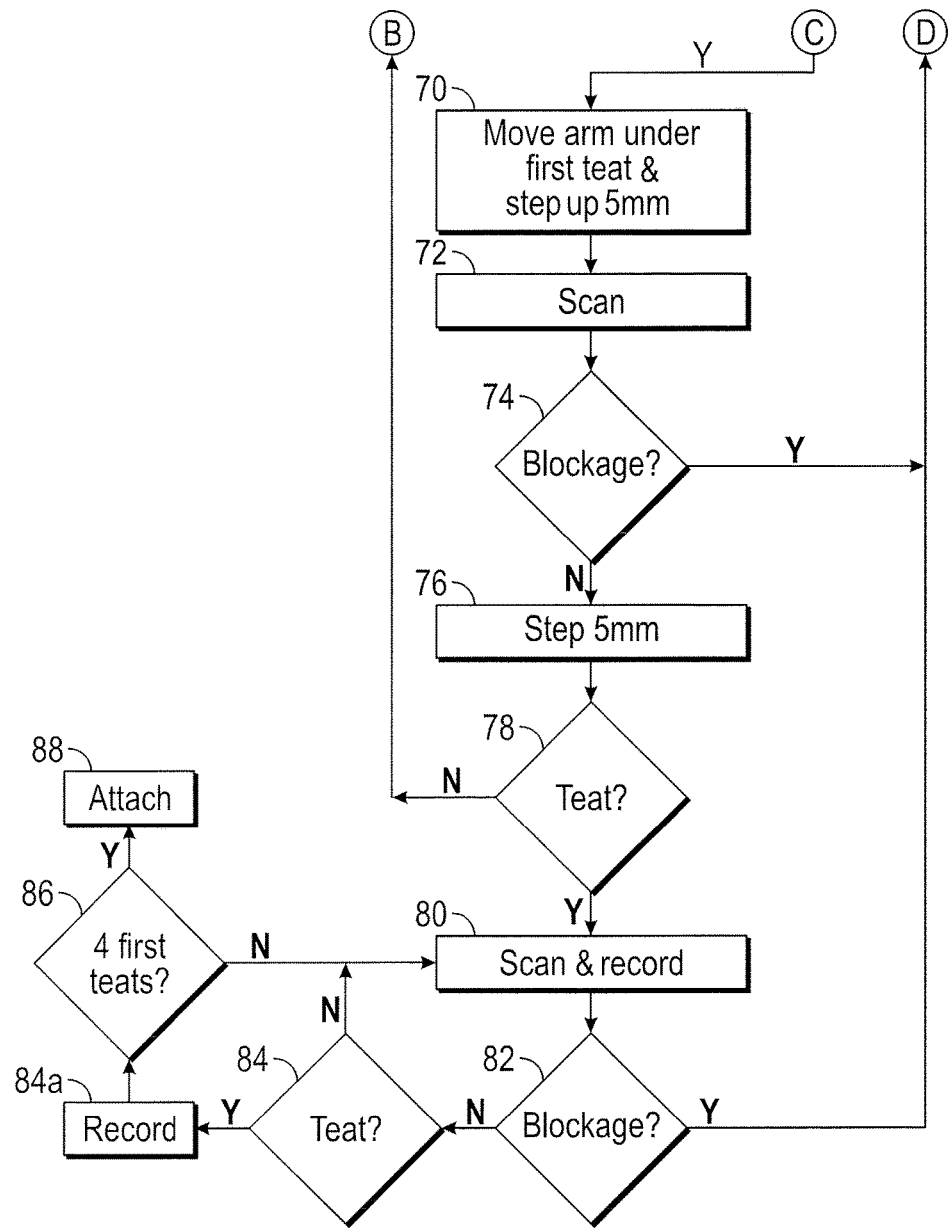
FIG. 2 (contd.)

SYSTEM AND METHOD FOR PREPARATION CUP ATTACHMENT

TECHNICAL FIELD OF THE INVENTION

This disclosure relates generally to the dairy industry and more particularly to a system and method for preparation cup attachment.

BACKGROUND OF THE INVENTION

Over time, the size and complexity of dairy milking operations have increased. Accordingly, the need for efficient and automated systems and methods that support dairy milking operations such as teat preparation cup attachment has also increased. However, systems and methods supporting such dairy milking operations have proven inadequate in various respects.

SUMMARY OF THE INVENTION

A system comprising a robotic arm and a sensor is disclosed. The robotic arm is operable to maneuver a teat preparation cup and execute instructions received from a robotic arm controller. The robotic arm controller comprises an interface, a memory, and a processor. The interface is operable to communicate with the robotic arm and the sensor. The memory is operable to store one or more teat identifiers associated with one or more teats of a dairy livestock. And the processor is operable to select a first teat identifier and instruct the sensor to perform a first scan. If the first scan discovers a first set of one or more teats, the processor is operable to record a first set of identifiers stored in the memory corresponding to the first set of teats, move the robotic arm a first distance in a first direction and instruct the sensor to perform a second scan. If the second scan discovers a second set of one or more teats, the processor is operable to record a second set of identifiers stored in the memory corresponding to the second set of teats, determine that the first recorded set of teat identifiers and the second recorded set of teat identifiers each comprises the first teat identifier, move the robotic arm to a location under the first teat, and instruct the sensor to perform a third scan. The processor is further operable to determine if the third scan discovers a third set of one or more teats and record a third set of teat identifiers stored in the memory corresponding to the third set of teats. And if each of the first set, second set, and third set of teat identifiers comprises the first teat identifier, the processor is operable to instruct the robotic arm to attach the preparation cup to the first teat.

The present embodiment presents several technical advantages. For example, in the present embodiment, a robotic arm in conjunction with a preparation cup is able to prepare a teat for milking. Further, in this embodiment, the sensor performs scans at multiple points during a preparation cup attachment process so a robotic arm controller has greater confidence that a selected teat is present at a selected location before instructing the robotic arm to attach a preparation cup to the teat.

Certain embodiments of the present disclosure may include some, all, or none of these advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION OF THE INVENTION

Embodiments of the present disclosure and its advantages are best understood by referring to FIGS. 1 through 6 of the drawings, like numerals being used for like and corresponding parts of the various drawings.

In the dairy industry, collecting milk from dairy livestock such as cows is an important part of dairy farming. The process of collecting milk typically involves preparing dairy livestock teats by treating the teats with preparation fluid such as detergent and other chemicals prior to milking the teats to extract milk. This is generally done by first placing a teat inside a teat preparation cup to wash the teat with the preparation fluid. The preparation fluid flows from a source through the preparation cup into a fluid disposal chamber. After this preparation process, the teat is milked using a separate milking cup.

It is advantageous to use robotics to perform these teat preparation and milking steps. As one example, a robotic arm and sensors can be used to detect a teat and automatically attach the teat prep or milking cup to the teat. However, accurately determining the location of a teat using sensors presents several challenges. For instance, a sensor may determine that a teat is at a first position but the cow may move before the robotic arm can attach the preparation cup to the teat. Further, the automated system may have difficulty determining whether all the teats of the cow have been prepped before the system begins milking.

The embodiments of the present disclosure address several of these challenges. In one embodiment contemplated by the present disclosure, a teat selection and attachment system is disclosed that performs multiple scans of a predetermined area before attaching a preparation cup to a teat. After each scan, a controller determines if the scan discovered the correct teat and moves the robotic arm closer to the correct teat. After a set number of scans, the controller determines that the correct teat has been found and attaches the preparation cup to the teat. For example, the system may perform multiple scans to discover the front right teat. If the system discovers the front right teat in each successive scan, the robotic arm attaches the preparation cup to the front right teat. If the system does not discover the front right teat in each successive scan, the system resets and tries again.

Figure 1:
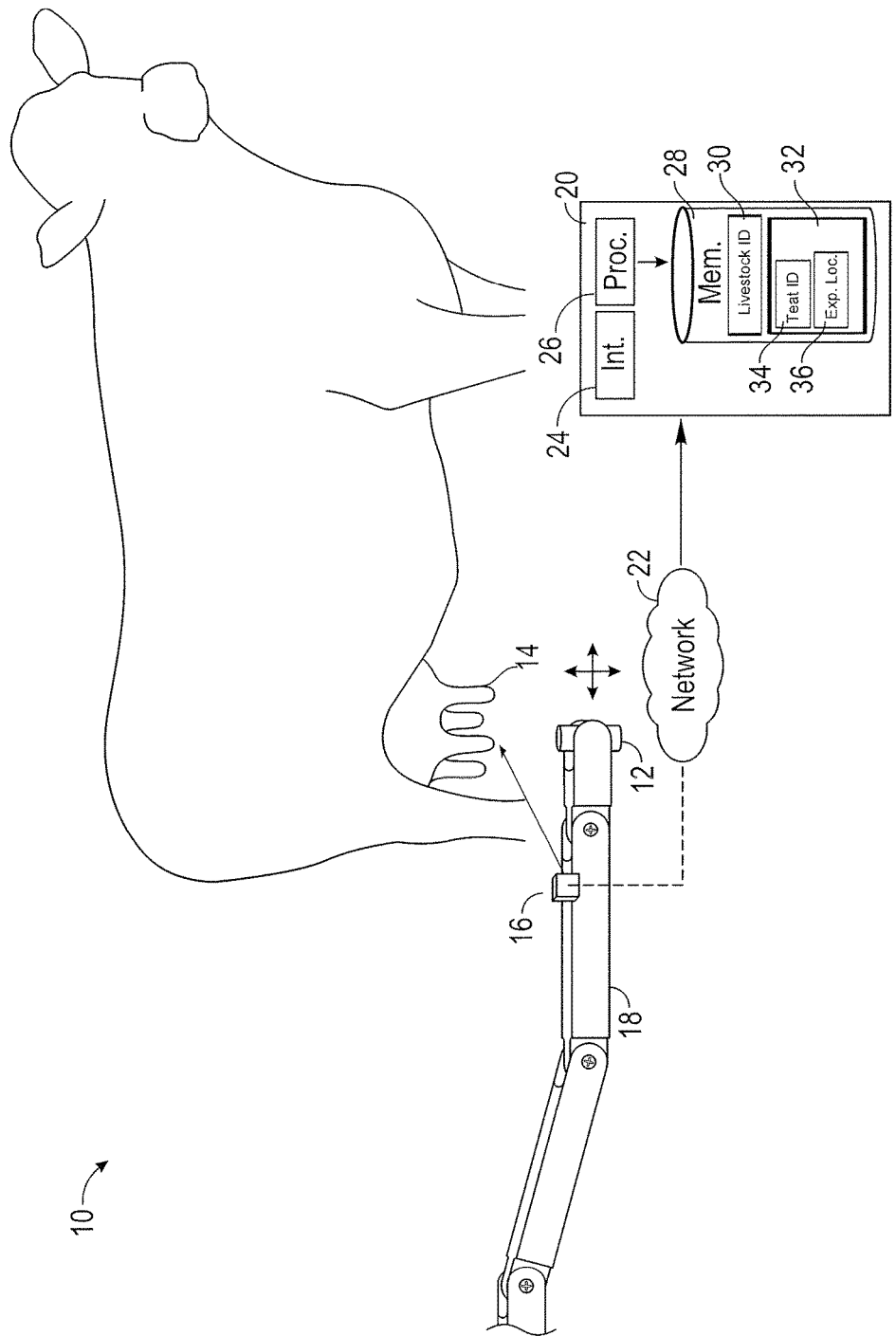
FIG. 1 illustrates a general overview of an automated system for selecting and attaching a cup to a teat.
Figure 2:
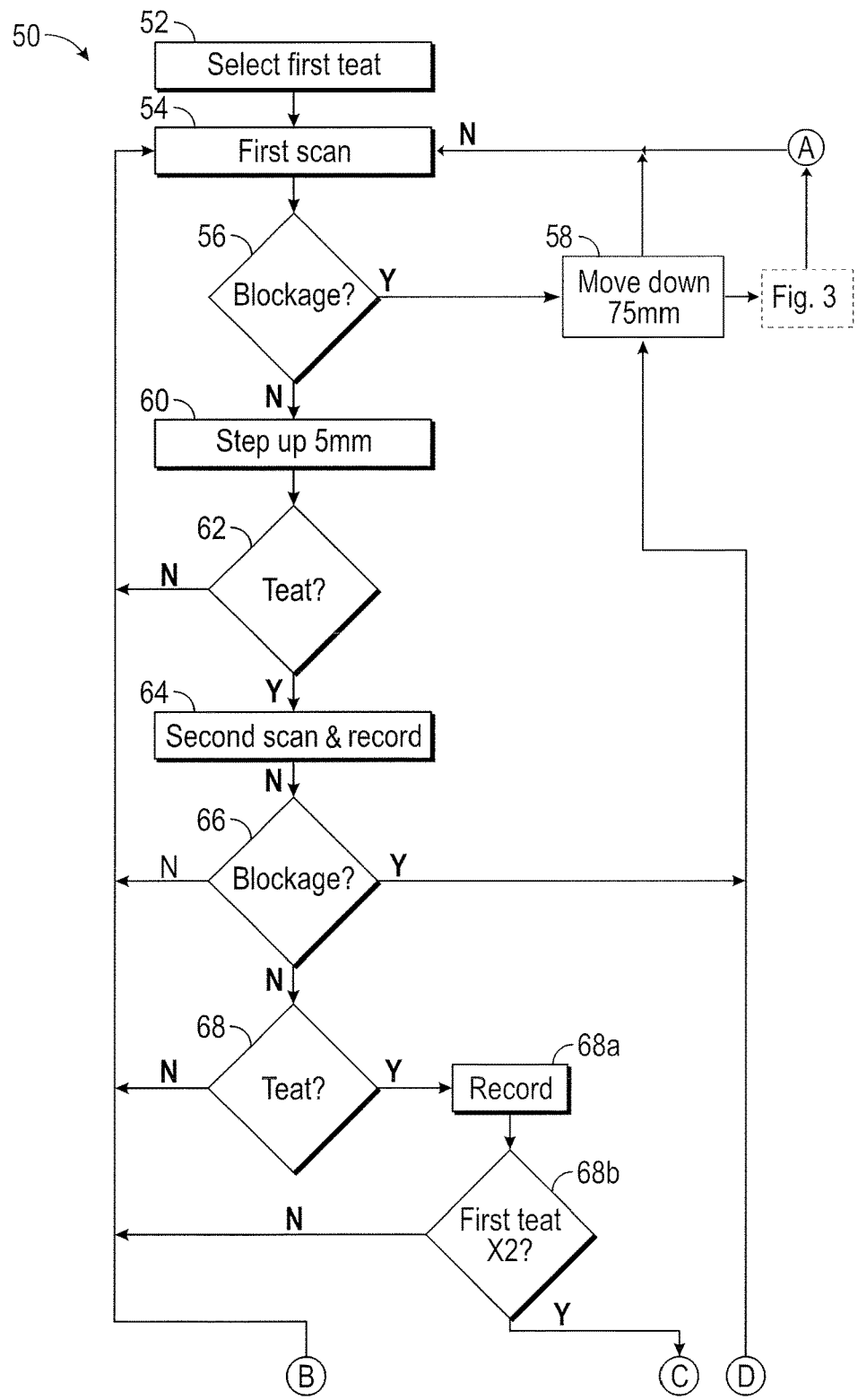
FIG. 2 illustrates a process for selecting and attaching a cup to a teat.
Figure 3:
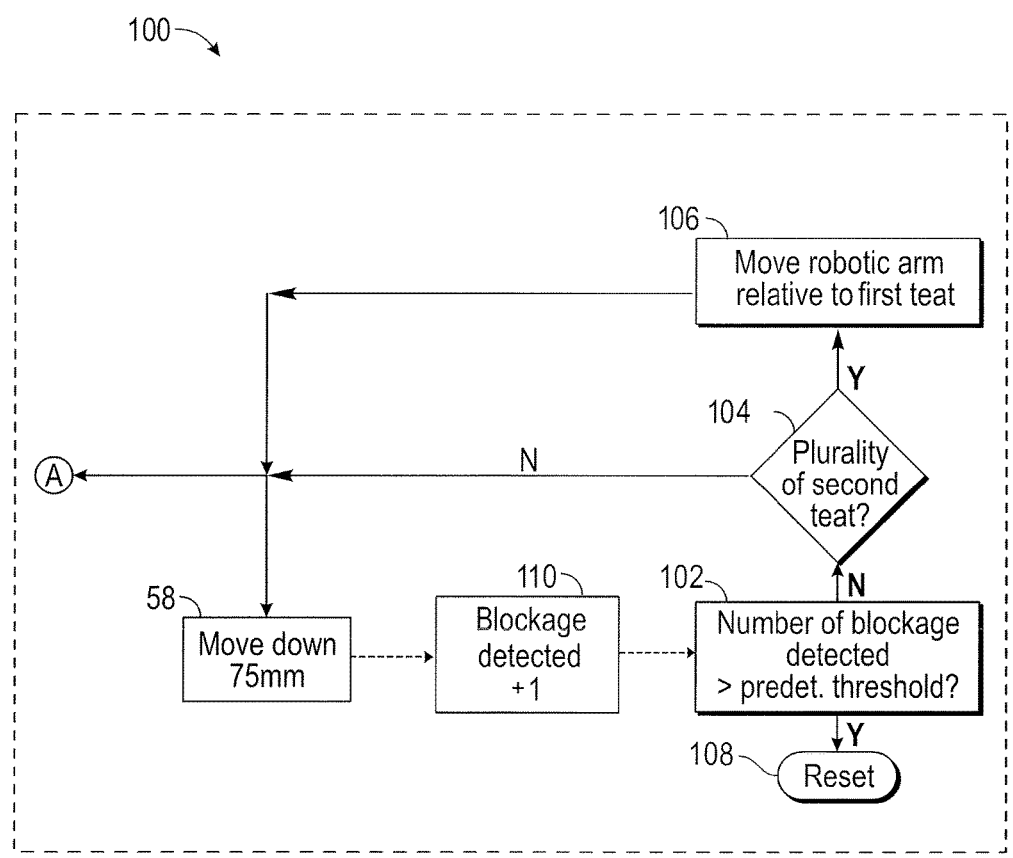
FIG. 3 illustrates another process for adjusting the robotic arm after a predetermined number of blockages.
Figure 4:
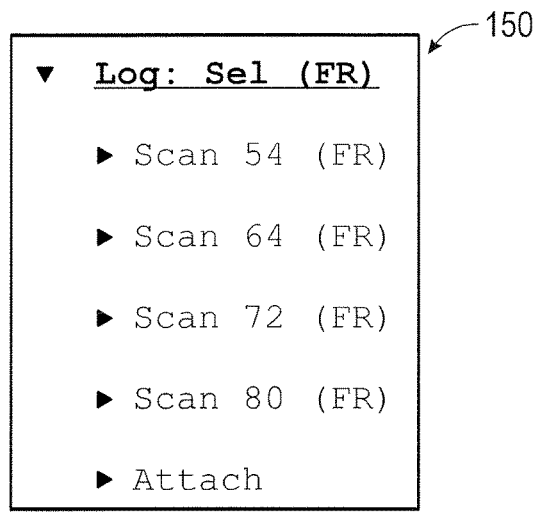
FIG. 4 illustrates a first log of teat identifiers discovered by the sensor and actions performed by the robotic arm.
Figure 5:
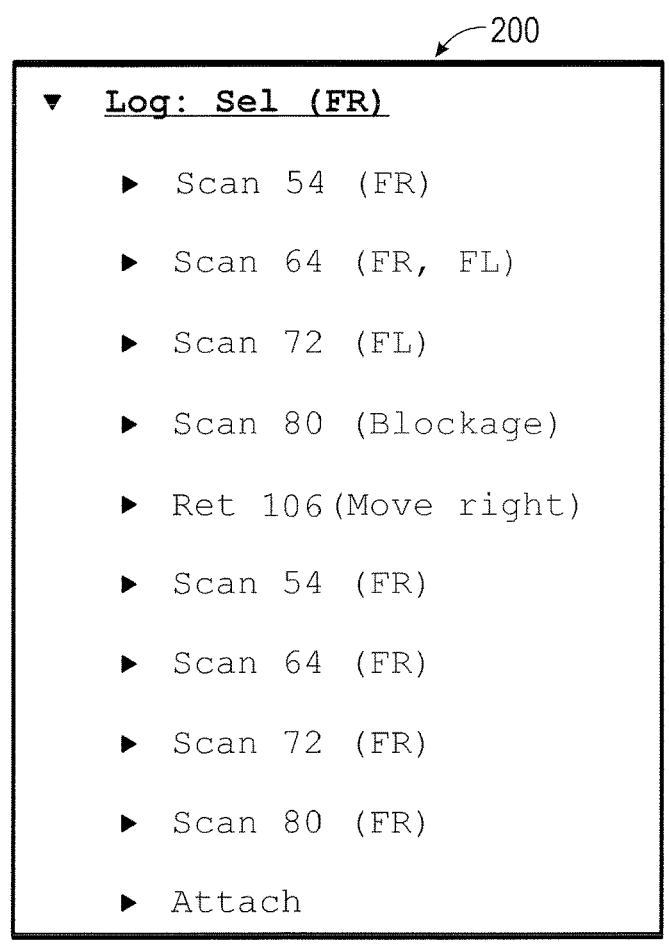
FIG. 5 illustrates a second log of teat identifiers discovered by the sensor and actions performed by the robotic arm.
Figure 6:
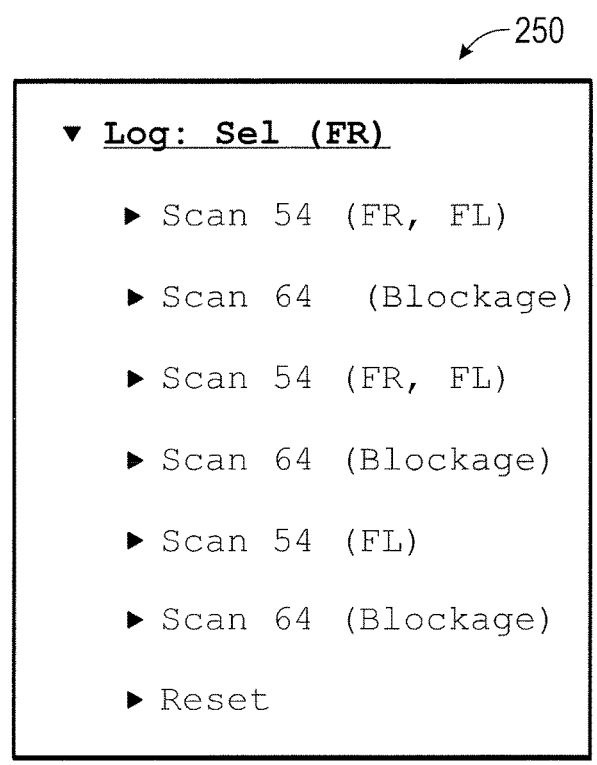
FIG. 6 illustrates a third log of teat identifiers discovered by the sensor and actions performed by the robotic arm.

The present disclosure will be described in more detail using FIGS. 1 through 6. FIG. 1 illustrates a general overview of an automated system for selecting and attaching a cup to a teat. FIG. 2 illustrates a process for selecting and attaching a cup to a teat. FIG. 3 illustrates another process for adjusting the robotic arm after a predetermined number of blockages. FIGS. 4-6 illustrate computer logs of teat identifiers discovered by the sensor and actions performed by the robotic arm in different situations. Although the figures and following description relate to the attachment of a preparation cup to a teat, the disclosed system may be used in conjunction with a milking cup or any other related cup or container.

FIG. 1 illustrates a system 10 for selecting and attaching a preparation cup 12 to a teat 14. In system 10, sensor 16 performs scans of its environment to detect one or more teats 14 of a dairy livestock. Sensor 16 and robotic arm 18 communicate with controller 20 via network 22. Controller 20 sends instructions to sensor 16 to perform scans of the environment and uses the data collected by sensor 16 to find a particular teat 14. Controller 20 also sends instructions to robotic arm 18 to move to a particular location and to attach preparation cup 12 to a teat 14.

In system 10, preparation cup 12 may be any suitable container or conduit through which fluid may flow. In one embodiment, preparation cup 12 is made of a flexible material which may compress or expand in response to changes in internal and external air pressure. Preparation cup 12 may have multiple openings. A first opening of preparation cup 12 may be large enough for teat 14 to be inserted into preparation cup 12. A second opening of preparation cup 12 may serve as an ingress for treatment fluid such as detergents and treatment chemicals to flow into preparation cup 12. A third opening of preparation cup 12 may serve as an egress through which the treatment fluid exits preparation cup 12.

Teat 14 may be one or more teats of any suitable dairy livestock. For example, teat 14 may belong to a cow, buffalo, goat, or any other suitable dairy livestock. In various embodiments, the dairy livestock may have a plurality of teats 14. Generally, dairy livestock such as cows have four teats 14. Teats 14 may be positioned in a predetermined orientation on a dairy livestock udder. For example, there may be a front right teat, a front left teat, back right teat, and back left teat where the front teats are closer to the dairy livestock's head and the back teats are closer to the dairy livestock's rear.

In system 10, sensor 16 may be any electronic or electromechanical device, including lasers, sonars, cameras, or other similar positional sensors, operable to scan an environment and capture positional data about the environment. In one embodiment, a laser scans an environment and captures data indicating the position of one or more teats 14. In some embodiments, if sensor 16 transmits a noisy or high density response to a laser emission or a sonar pulse, controller 20 may determine that sensor 16 has encountered a blockage. Sensor 16 may encounter a blockage when the robotic arm is too close to the dairy livestock's udder or the sensor is dirty or clogged.

In system 10, robotic arm 18 may be any electromechanical device operable to extend beneath a dairy livestock and position preparation cup 12. In one embodiment, robotic arm 18 may be operable to communicate with controller 20 and receive information and instructions for moving in various directions. As an example, controller 20 may instruct robotic arm 18 to move five millimeters up in a vertical direction and, in response, robotic arm 18 may move five millimeters up in the vertical direction. Robotic arm 18 may also send controller 20 information indicating that robotic arm 18 executed instructions provided by controller 20, that robotic arm 18 encountered an error, that robotic arm 18 is not powered on or any other similar suitable instructions.

Controller 20 may comprise an interface 24, a processor 26, and a memory 28. The components of controller 20 may interact with each other to receive information from sensor 16 and robotic arm 18, process that information, and determine whether sensor 20 has discovered one or more teats 14. Controller 20 may communicate with other aspects of system 10 via network 22.

Network 22 may include any interconnecting system capable of transmitting audio, video, signals, data, messages, or any combination of the preceding. Network 22 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 10.

Interface 24 represents any port or connection, real or virtual, including any suitable hardware and/or software, including protocol conversion and data processing capabilities, to communicate through a LAN, WAN, or other communication system that allows controller 20 to exchange information with sensor 16, robotic arm 18, or any other components of system 10. Interface 24 receives information from and transmits information to the various components of system 10. Interface 24 may communicate with processor 26 and memory 28.

Processor 26 may be any electronic circuitry, including, but not limited to microprocessors, application specific integrated circuits (ASIC), application specific instruction set processor (ASIP), and/or state machines, that communicatively couples interface 24 and memory 28 and controls the operation of controller 20. In some embodiments, processor 26 may be single core or multi-core having a single chip containing two or more processing devices. Processor 26 may be 8-bit, 16-bit, 32-bit, 64-bit or of any other suitable architecture. Processor 26 may comprise an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 26 may include other hardware and software that operates to control and process information. Processor 26 may execute computer-executable program instructions stored in memory 28. Processor 26 is not limited to a single processing device and may encompass multiple processing devices.

Memory 28 may include any one or a combination of volatile or non-volatile local or remote devices suitable for storing information. For example, memory 28 may include RAM, ROM, flash memory, magnetic storage devices, optical storage devices, network storage devices, cloud storage devices, solid state devices, or any other suitable information storage device or a combination of these devices. Memory 28 stores, either permanently or temporarily, data, operational software, other information for processor 26, other components of controller 20, or other components of system 10. For example, memory 28 may store user preferences or default settings for operating controller 20. Memory 28 may store information in one or more databases, file systems, tree structures, relational databases, any other suitable storage system, or any combination thereof. Furthermore, different information stored in memory 28 may use any of these storage systems. The information stored in memory 28 may be encrypted or unencrypted, compressed or uncompressed, and static or editable. Memory 28 may store information in one or more caches.

In one embodiment, memory 28 may store a dairy livestock identifier 30 and a file 32 for each dairy livestock. Each file may store teat identifiers 34 and a corresponding expected location 36 for each teat 14 of that dairy livestock. For example, memory 28 may store teat identifiers 34 and expected location data 36 for each of the front left teat, the front right teat, the back left teat, and the back right teat of each of several dairy livestock. Expected location 36 may comprise data indicating or representing the position of one or more teats 14 inside a milking stall. For example, expected location 36 may comprise one or more sets of coordinates for the positions of the one or more teats 14. Expected location 36 may be generated through any suitable means and may be stored in any suitable manner. For example, expected location 36 may be stored in one or more databases. In such an embodiment, expected location 36 may be entered into the one or more databases by a user or it may be captured by a positioning system. In one embodiment, the one or more databases may store the expected location 36 of specific teats 14 for multiple dairy livestock.

In operation, controller 20 is operable to select a first teat 14 and instruct sensor 16 to perform a first scan. Controller 20 receives the results of the first scan and determines if sensor 16 discovered a blockage or one or more teats 14. If sensor 16 discovers a blockage, controller 20 instructs robotic arm 18 to move a predetermined distance away from the dairy livestock and instructs sensor 16 to perform another scan. If robotic arm 18 finds one or more teats 14, controller 20 records which teats 14 were discovered and instructs robotic arm 18 to moves closer to the dairy livestock. Sensor 16 and robotic arm 18 then repeat these instructions a suitable number of times. If sensor 16 discovers the first teat 14 on multiple scans, controller 20 instructs robotic arm 18 to attach preparation cup 12 to first teat 14. Controller 20 then instructions sensor 16 and robotic arm 18 to perform the steps again on each of the remaining teats 14. One embodiment of this process is explained below in reference to FIG. 2.

FIG. 2 illustrates a process 50 depicting one example set of instructions that controller 20 may provide to sensor 16 and robotic arm 18 to select and attach preparation cup 12 to a first teat 14. Controller 20 executes the steps of process 50 for one teat 14 of a dairy livestock and then repeats process 50 for each of the remaining teats of that dairy livestock.

As illustrated in FIG. 2, at step 52, controller 20 selects a first teat 14 onto which robotic arm 18 will attach preparation cup 12. Next, at step 54, sensor 16 performs a first scan of its environment and communicates the data collected to controller 20. At step 56, controller 20 determines if sensor 16 discovered a blockage in the first scan. If sensor 16 discovered a blockage, then, at step 58, controller 20 instructs robotic arm 18 to move a predetermined distance away from the dairy livestock. In the illustrated embodiment, robotic arm 18 moves down seventy-five millimeters or any other appropriate distance and process 50 resets to step 54 where sensor 16 performs the first scan again. If sensor 16 does not discover a blockage at step 56, controller 20 instructs robotic arm 18 to move up by a predetermined distance. In the illustrated embodiment, at step 60, robotic arm 18 moves closer to the dairy livestock by five millimeters or any other appropriate distance. At step 62, controller 20 determines if sensor 16 discovered one or more teats 14 during the first scan. If sensor 16 does not discover one or more teats 14 during the first scan, controller 20 returns to step 54 and sensor 16 performs the first scan again.

If sensor 16 discovers one or more teats 14 at step 62, controller 20 records the teat identifiers 34 of the discovered teats 14 and instructs sensor 16 to perform a second scan at step 64. Then, at step 66, controller 20 determines if sensor 16 discovered a blockage in the second scan. If sensor 16 discovers a blockage at step 66 then controller 20 instructs robotic arm 18 to move down by the predetermined distance of seventy-five millimeters or any other appropriate distance at step 58 and returns to step 54. If sensor 16 does not discover a blockage at step 66, then controller 20 determines if sensor 16 discovered one or more teats 14 at step 68. If sensor 16 does not discover any teats 14 at step 68, controller 20 instructs sensor 16 to perform the first scan again at step 54. If sensor 16 discovers one or more teats at step 68, controller 20 records the teat identifiers 34 of the discovered teats 14 at step 68*a*. Then, at step 68*b*, controller 20 compares the recorded teat identifiers 34 from the first scan at step 54 and the recorded teat identifiers 34 from the second scan at step 64 to determine if the first selected teat 14 was discovered during both the first scan at step 54 and the second scan at step 64. If sensor 16 does not discover the first selected teat 14 in both the first scan at step 54 and the second scan at step 64, then controller 20 instructs sensor 16 to return to step at step 54 and perform the first scan again. If sensor 16 discovers the first teat 14 in both the first scan at step 54 and the second scan at step 64 then controller 20 instructs robotic arm 18 to move under the first selected teat 14 and to move up five millimeters or any other appropriate distance at step 70.

At step 72 controller 20 instructs sensor 16 to perform a third scan of its environment. At step 74 controller 20 determines if sensor 16 discovered a blockage in the third scan. If sensor 16 discovers a blockage, then controller 20 instructs robotic arm 18 to move down the predetermined distance of seventy-five millimeters or any other appropriate distance at step 58 and perform the first scan again at step 54. If sensor 16 does not discover a blockage at step 74, then at step 76 robotic arm 18 moves up by the predetermined distance of five millimeters or any other appropriate distance. At step 78, controller 20 determines if sensor 16 discovered one or more teats 14 as a result of the third scan. If sensor 16 does not discover one or more teats 14, then controller 20 instruct sensor 16 to perform the first scan again at step 54. If sensor 16 discovers one or more teats 14 at step 78, then controller 20 records the teat identifiers 34 of the discovered teats and instructs sensor 16 to perform a fourth scan at step 80.

Controller 20 then determines at step 82 if sensor 16 discovered a blockage in the fourth scan. If sensor 16 discovered a blockage in the fourth scan, then controller 20 instructs robotic arm 18 to move down by the predetermined distance of seventy-five millimeters or any other appropriate distance at step 58 and to perform the first scan again at step 54. If sensor 16 does not discover a blockage at step 82 then controller 20 determines if sensor 16 discovered one or more teats 14 at step 84. If sensor 16 does not discover one or more teats 14 at step 84 then controller 20 instructs sensor 16 to return to step 54 and perform the first scan again. If sensor 16 discovers one or more teats at step 84, controller 20 records the teat identifiers 34 of the discovered teats 14 at step 84*a*. Controller 20 then compares the teat identifiers 34 recorded after the first scan, the second scan, the third scan and the fourth scan to determine if the selected first teat 14 was discovered in all four scans. If the selected first teat 14 was not discovered in all four scans, then controller 20 instructs sensor 16 to return to step 54 and perform the first scan again. If controller 20 determines that sensor 16 discovered the selected first teat 14 in the first scan, the second scan, the third scan, and the fourth scan, then controller 20 instructs robotic arm 18 to attach preparation cup 12 to the selected first teat 14 at step 88.

Although process 50 has been described in a particular order using particular example values, process 50 may be modified without departing from the spirit of the disclosure. For example, in some embodiments, controller 20 may determine if sensor 16 discovered one or more teats at step 62 before instructing robotic arm 18 to move up by a predetermined distance at step 60. Similarly, controller 20 may instruct robotic arm 18 to move up any suitable distance or move down any suitable distance throughout process 50. In various embodiments, system 10 may perform some or all of process 50 to attach preparation cup 12 to a teat 14. For example, controller 20 may instruct robotic arm 18 to attach preparation cup 12 to the first selected teat 14 after any suitable number of scans and is not limited to attaching preparation cup 12 to the first selected teat 14 after four scans.

FIG. 3 illustrates an additional process 100 that extends from step 58 of process 50 illustrated in FIG. 2. In one embodiment of system 10, controller 20 may keep track of the number of blockages detected by sensor 16 before preparation cup 12 attaches to first selected teat 14. In such an embodiment, after sensor 16 detects a blockage at step 56, step 66, step 74 or step 82, controller 20 may increment a blockage count at step 110 and compare the blockage count to a predetermined threshold at step 102. If the blockage count is equal to or greater than the predetermined threshold, controller 20 may reset system 10 at step 108. For example, in one embodiment, controller 20 may reset system 10 if sensor 16 discovers a blockage three or more times before attaching preparation cup 12 to teat 14. Controller 20 may reset system 10 in any suitable manner including by retracting robotic arm 18, providing an error message to a user, searching for or otherwise acquiring a new set of expected location data 36, restarting sensor 16, releasing the dairy livestock, any combination of these functions or any other suitable function.

If, at step 102, the blockage count is less than the predetermined threshold, controller 20 may determine whether sensor 16 discovered a particular second teat two or more times in the previous scans at step 104. For instance, in such an embodiment, controller 20 may determine that sensor 16 discovered the second teat in the third and fourth scans before encountering a blockage. In such a situation, at step 106, controller 20 may instruct robotic arm 18 to move in a direction that compensates for the difference between the second teat and the first teat. For example, if the first selected teat is the front right teat and sensor 16 discovers the front left teat during the third and fourth scans, then at step 106 controller 20 may instruct robotic arm 18 to move to the right by a predetermined distance before sensor 16 performs the first scan at step 54. Similarly, if the first selected teat is the back right teat and sensor 16 discovers the front left teat during the third and fourth scans, then at step 106 controller 20 may instruct robotic arm 18 to move backward and to the right by a predetermined distance before sensor 16 performs the first scan at step 54.

FIGS. 4 to 6 illustrate logs of teats 14 discovered by sensor 16 while executing processes 50 and 100 described above in relation to FIGS. 2 and 3. The logs of FIGS. 4-6 provide three different illustrative examples of use-cases for system 10. In FIG. 4, log 150 illustrates the case in which controller 20 has selected the front right teat 14 as the first selected teat 14. Here, sensor 16 discovers the front right teat 14 in the first scan at step 54, the second scan at step 64, the third scan at step 72, and the fourth scan at step 80. Because all four scans return the first selected teat 14, which in this case is the front right teat 14, controller 20 instructs robotic arm 18 to attach preparation cup 12 to the front right teat 14.

FIG. 5 illustrates a second log 200 where controller 20 selects the front right teat 14 as the first selected teat 14. In this embodiment, sensor 16 discovers the front right teat 14 in the first scan at step 54. Sensor 16 then discovers the front right teat 14 and the front left teat 14 in the second scan at step 64. Senor 16 discovers the front left teat 14 in the third scan at step 72. And sensor 16 discovers a blockage in the fourth scan at step 80. This prompts controller 20 to move to step 58 in FIG. 2. Robotic arm 18 moves down a predetermined distance. Then, at step 102 of FIG. 3, controller 20 determines if the number of discovered blockages has exceeded a predetermined threshold. Here, the number of blockages has not exceeded the threshold. Controller 20 then determines, at step 104, if a particular second teat has been discovered in a plurality of the scans. Here, the front left teat 14 was discovered in the second and third scans. As a result, at step 106, controller 20 instructs robotic arm 18 to compensate for the difference between the discovered front left teat 14 and the selected front right teat 14 by instructing robotic arm 18 to move to the right by a predetermined distance.

After robotic arm 18 moves right, sensor 16 performs the first scan at step 54 again and discovers the front right teat 14. Sensor 16 then discovers the front right teat 14 again as a result of the second scan at step 64, the third scan at step 72, and the fourth scan at step 80. Because sensor 16 discovers the first selected teat 14 which in this case is the front right teat 14 in all four scans, controller 20 instructs robotic arm 18 to attach preparation cup 12 to the front right teat 14.

FIG. 6 illustrates a third log 250 documenting the data capture by sensor 16 and the response by controller 20. In this situation, controller 20 has selected the front right teat 14 as the first selected teat 14. Here sensor 16 discovers the front right teat 14 and front left teat 14 in the first scan at step 54. Sensor 16 then discovers a blockage in the second scan at step 64. Sensor 16 then performs the first scan at step 54 again and discovers the front right teat and the front left teats 14. Sensor 16 then discovers another blockage at the second scan at step 64. Sensor 16 then performs the first scan at step 54 again and discovers the front left teat 14. Sensor 16 then discovers another blockage at the second scan at step 64. Because the numbers of blockages discovered has exceeded the predetermined threshold of three blockages at step 102, controller 20 instructs robotic arm 18 and sensor 16 to reset the attachment process at step 108.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
a robotic arm having a sensor, wherein the robotic arm is operable to maneuver a teat preparation cup and execute instructions received from a robotic arm controller; and
the robotic arm controller comprising:
an interface operable to communicate with the robotic arm and the sensor;
a memory operable to store one or more teat identifiers associated with one or more teats of a dairy livestock; and
a processor operable to:
select a first teat identifier from the memory and instruct the sensor to perform a first scan;
if the first scan discovers a first set of one or more teats, record a first set of identifiers stored in the memory corresponding to the first set of teats, move the robotic arm a first distance toward the dairy livestock and instruct the sensor to perform a second scan;
if the second scan discovers a second set of one or more teats, record a second set of identifiers stored in the memory corresponding to the second set of teats, determine that the first recorded set of teat identifiers and the second recorded set of teat identifiers each comprises the first teat identifier, move the robotic arm to a location under the first teat, and instruct the sensor to perform a third scan;
determine if the third scan discovers a third set of one or more teats and record a third set of teat identifiers stored in the memory corresponding to the third set of teats; and
if each of the first set, second set, and third set of teat identifiers comprises the first teat identifier, instruct the robotic arm to attach the preparation cup to the first teat.

2. The system of claim 1, wherein if the first scan, the second scan, or the third scan discovers a blockage indicating that the robotic arm is proximate to the dairy livestock, the processor is further operable to instruct the robotic arm to move a second distance away from the dairy livestock and perform the first scan again.

3. The system of claim 2, wherein:
the one or more stored teat identifiers indicate a front right teat, front left teat, back right teat, and back left teat; and
the processor is further operable to:
determine, subsequent to discovering a blockage, if a plurality of the sets of recorded identifiers comprise a second teat identifier corresponding to a second teat; and
move the robotic arm based on the position of the second teat relative to the first teat.

4. The system of claim 3, wherein:
the first teat is the front right teat, the discovered second teat is the front left teat, and the processor is operable to move the robotic arm to the right; or
the first teat is the front right teat, the discovered second teat is the back right teat, and the processor is operable to move the arm forward; or
the first teat is the front right teat, the discovered second teat is the back left teat, and the processor is operable to move the arm forward and to the right.

5. The system of claim 3, wherein:
the first teat is the front left teat, the discovered second teat is the front right teat, and the processor is operable to move the arm to the left; or
the first teat is the front left teat, the discovered second teat is the back left teat, and the processor is operable to move the arm forward; or
the first teat is the front left teat, the discovered second teat is the back right teat, and the processor is operable to move the arm forward and to the left.

6. The system of claim 3, wherein:
the first teat is the back right teat, the discovered second teat is the back left teat, and the processor is operable to move the arm to the right; or
the first teat is the back right teat, the discovered second teat is the front right teat, and the processor is operable to move the arm backward; or
the first teat is the back right teat, the discovered second teat is the front left teat, and the processor is operable to move the arm backward and to the right.

7. The system of claim 3, wherein:
the first teat is the back left teat, the discovered second teat is the back right teat, and the processor is operable to move the arm to the left; or
the first teat is the back left teat, the discovered second teat is the front left teat, and the processor is operable to move the arm backward; or
the first teat is the back left teat, the discovered second teat is the front right teat, and the processor is operable to move the arm backward and to the left.

8. The system of claim 3, wherein the processor is further operable to move the robotic arm into a retracted position if the sensor discovers a blockage a predetermined number of times prior to instructing the robotic arm to attach the preparation cup to the first teat.

9. The system of claim 2, wherein the robotic arm moves vertically the second distance away from the dairy livestock.

10. The system of claim 1, wherein if the third scan discovers a third set of one or more teats, the processor is further operable to:
record identifiers of the third set of one or more discovered teats and instruct the sensor to perform a fourth scan; and
if each of the first set, second set, third set, and fourth set of teat identifiers comprises the first teat identifier, instruct the robotic arm to attach the preparation cup to the first teat.

11. A method comprising:
selecting, by a processor, a first teat identifier and instructing a sensor mounted on a robotic arm to perform a first scan under a dairy livestock;
if the first scan discovers a first set of one or more dairy livestock teats, recording a first set of identifiers corresponding to the first set of discovered teats, moving the robotic arm a first distance toward the dairy livestock and instructing the sensor to perform a second scan;
if the second scan discovers a second set of one or more teats, recording a second set of identifiers corresponding to the second set of discovered teats, determining that the first recorded set of teat identifiers and the second recorded set of teat identifiers each comprises the first teat identifier, moving the robotic arm to a location under the first teat, and instructing the sensor to perform a third scan;
determining if the third scan discovers a third set of one or more teats and recording a third set of teat identifiers corresponding to the third set of discovered teats; and if each of the first set, second set, and third set of teat identifiers comprises the first teat identifier, instructing the robotic arm to attach the preparation cup to the first teat.

12. The method of claim 11, wherein if the first scan, the second scan, or the third scan discovers a blockage indicating that the robotic arm is proximate to the dairy livestock, instructing the robotic arm to move a second distance in a direction away from the dairy livestock and performing the first scan again.

13. The method of claim 11, further comprising:
determining, subsequent to discovering a blockage, if a plurality of the sets of recorded identifiers comprise a second teat identifier corresponding to a second teat; and
moving the robotic arm based on the position of the second teat relative to the first teat.

14. The method of claim 12, further comprising resetting the robotic arm if the sensor discovers a blockage a predetermined number of times prior to instructing the robotic arm to attach the preparation cup to the first teat.

15. The method of claim 11, wherein if the third scan discovers a third set of one or more teats:
recording identifiers of the third set of one or more discovered teats and instructing the sensor to perform a fourth scan; and
if each of the first set, second set, third set, and fourth set of teat identifiers comprises the first teat identifier, instructing the robotic arm to attach the preparation cup to the first teat.

16. A controller comprising:
an interface operable to communicate with a robotic arm and a sensor mounted on the robotic arm;
a memory operable to store one or more teat identifiers associated with one or more teats of a dairy livestock; and
a processor operable to:
select a first teat identifier from the memory and instruct the sensor to perform a first scan;
if the first scan discovers a first set of one or more teats, record a first set of teat identifiers from the memory corresponding to the first set of discovered teats, move the robotic arm a first distance toward the dairy livestock and instruct the sensor to perform a second scan;
if the second scan discovers a second set of one or more teats, record a second set of teat identifiers from the memory corresponding to the second set of discovered teats, determine that the first recorded set of teat identifiers and the second recorded set of teat identifiers each comprises the first teat identifier, instruct the robotic arm to move to a location under the first teat, and instruct the sensor to perform a third scan;
determine if the third scan discovers a third set of one or more teats and record a third set of teat identifiers corresponding to the third set of teats; and
if each of the first set, second set, and third set of teat identifiers comprises the first teat identifier, instruct the robotic arm to attach a cup to the first teat.

17. The controller of claim 16, wherein if the first scan, the second scan, or the third scan discovers a blockage indicating that the robotic arm is proximate to the dairy livestock, the processor is further operable to instruct the robotic arm to move a second distance away from the dairy livestock and perform the first scan again.

18. The controller of claim 16, wherein:
the one or more stored teat identifiers indicate a front right teat, front left teat, back right teat, and back left teat; and
the processor is further operable to:
determine, subsequent to discovering a blockage, if a plurality of the sets of recorded identifiers comprise a second teat identifier corresponding to a second teat; and
instruct the robotic arm to move based on the position of the second teat relative to the first teat.

19. The controller of claim 16, wherein the processor is further operable to send a reset instruction to the robotic arm if the sensor discovers a blockage a predetermined number of times prior to instructing the robotic arm to attach the cup to the first teat.

20. The system of claim 16, wherein if the third scan discovers a third set of one or more teats, the processor is further operable to:
record identifiers from the memory of the third set of one or more discovered teats and instruct the sensor to perform a fourth scan; and
if each of the first set, second set, third set, and fourth set of teat identifiers comprises the first teat identifier, instruct the robotic arm to attach the cup to the first teat.

* * * * *